June 14, 1932.  P. J. DUIGNAN  1,863,367
POULTRY CAR
Filed Oct. 30, 1930   3 Sheets-Sheet 1

Inventor
Patrick J. Duignan
by Parker & Carter
Attorneys.

June 14, 1932.   P. J. DUIGNAN   1,863,367
POULTRY CAR
Filed Oct. 30, 1930   3 Sheets-Sheet 2
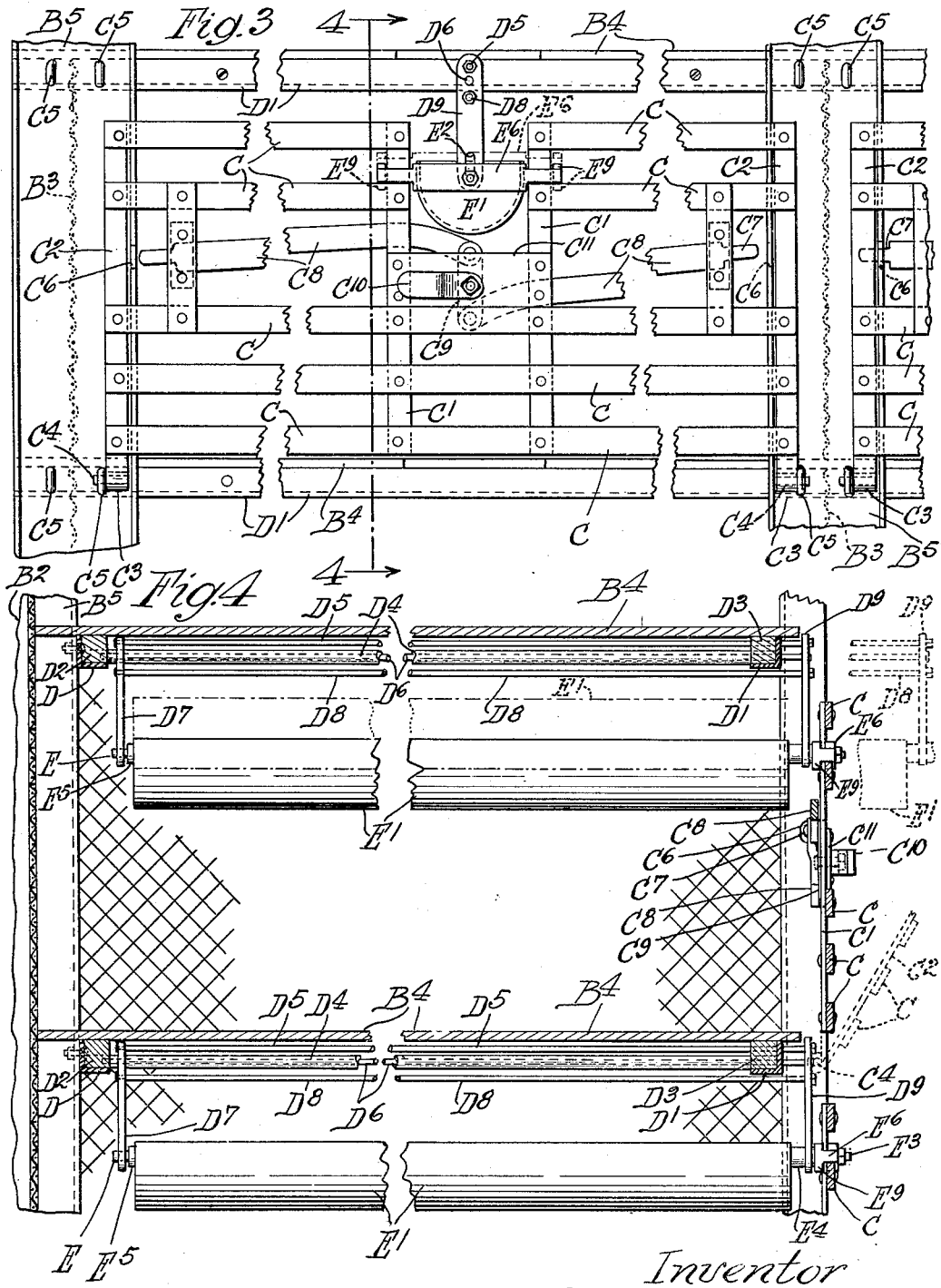

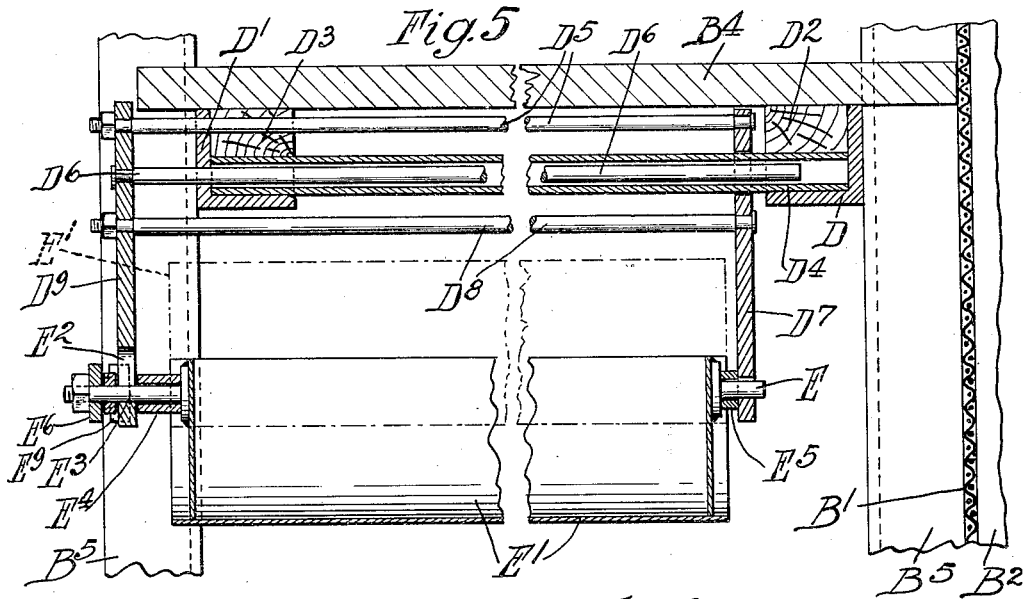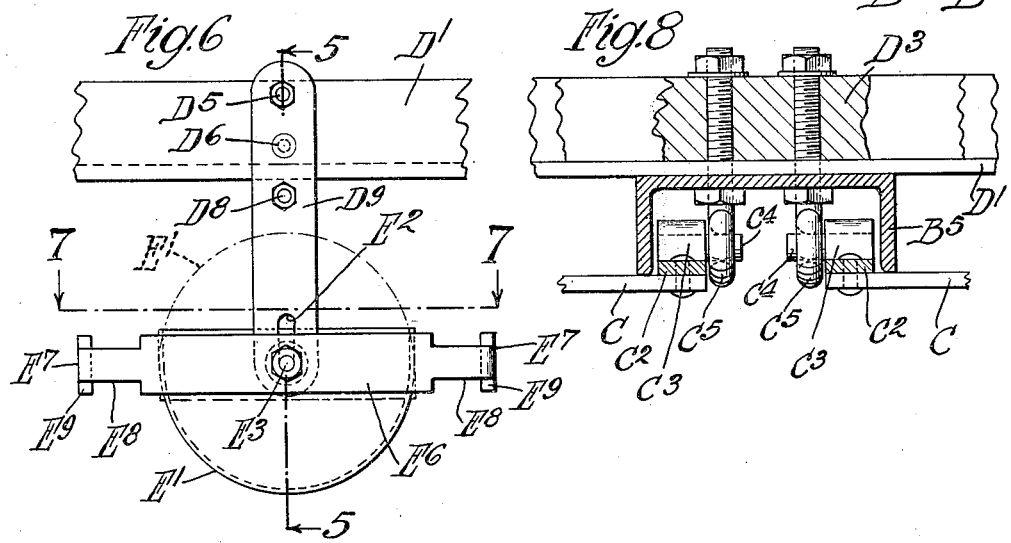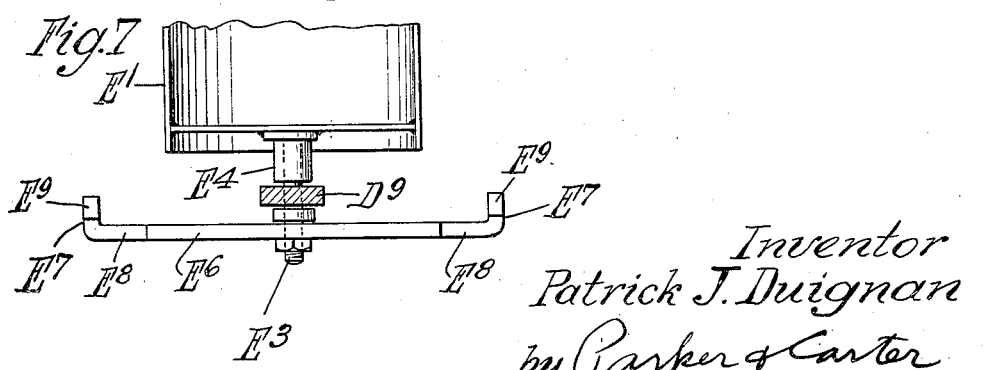

Patented June 14, 1932

1,863,367

UNITED STATES PATENT OFFICE

PATRICK J. DUIGNAN, OF KANKAKEE, ILLINOIS

POULTRY CAR

Application filed October 30, 1930. Serial No. 492,181.

My invention relates to improvements in poultry cars and the like and has for one object to provide a new and improved type of car for the shipment of poultry by railroad wherein increased coop capacity is available. Another object of my invention is to provide a new and improved form of door for the individual crates of a poultry car. Another object is to provide a new and improved arrangement for feeding trays or pans. Other objects will appear from time to time throughout the specification and claims.

My invention is illustrated more or less diagrammatically in the accompanying drawings, wherein—

Figure 3 is a side elevation on an enlarged scale of the coop shown in Figure 2 with the door in the unlocked position;

Figure 4 is a section along the line 4—4 of Figure 3;

Figure 5 is a section along the line 5—5 of Figure 4;

Figure 6 is a detail end elevation of the feeding trough;

Figure 7 is a section along the line 7—7 of Figure 6;

Figure 8 is a section along the line 8—8 of Figure 2.

Like parts are indicated by like characters throughout the specification and drawings.

Figures 1, 2:
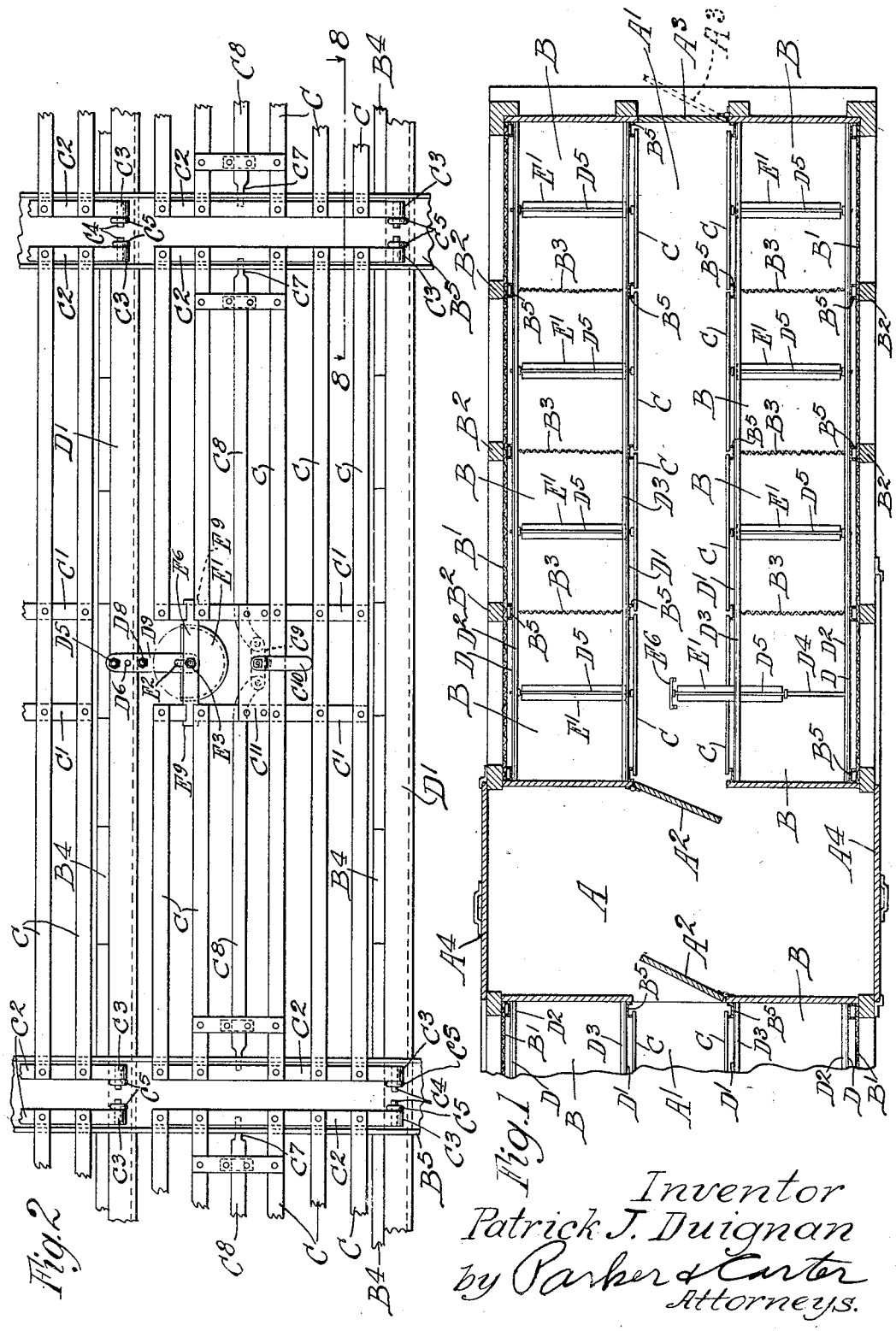
Figure 1 is a horizontal section through one end of a poultry car embodying my invention.
Figure 2 is a side elevation of one of the coops of the car.

The details of the car itself, that is the supporting frame, floor, etc. forming no part of my invention are not shown or described. The car comprises a state-room $A$ at the center of the car. Aisles $A^1$ extend longitudinally of the car at each side of the state-room to the ends of the car. The aisles terminate in doors $A^2$ communicating with the state-room and doors $A^3$ provide exits at the end of the car. The sides of the car are closed by the sliding door $A^4$.

The aisle takes up substantially one third of the width of the car; on either side of the aisle are coops B B. Each coop is substantially the same width as the aisle and is preferably longer than it is wide. There may be a number of coops, one above the other, three or four or five, perhaps even more or less as the case may be. The coops are closed at the outside of car by screening $B^1$ supported by car frame elements $B^2$. The coops are divided one from another by vertical partitions $B^3$ and each coop has a floor $B^4$. Inside of the car in line with the screening $B^3$ separating adjacent coops is a column, preferably of channel structure $B^5$. These columns are tied together by vertical angle irons $D$ $D^1$ and the irons are where necessary backed up by wood filler blocks $D^2 D^3$.

Each cage is open to the aisle throughout its entire area and closed where that is the case by a gate made up of a plurality of transverse slats C C extending the entire length of the cage and tied together by vertical bars $C^1$ $C^2$. Vertical bars $C^2$ terminate in hinged sockets $C^3$ from which project pins $C^4$ engaging I-bolts $C^5$ so that the door is hinged at the bottom. The channel column is provided with perforations $C^6$ adapted to be penetrated by pins $C^7$ on the locking bolts $C^8$. These locking bolts slide longitudinally of the door being pivoted at their inner ends on a T-bar $C^9$ with handle $C^{10}$ which bar is pivoted on a plate $C^{11}$. When in the position shown in Figure 3 the door is unlocked and swung down as indicated in dotted lines in Figure 4. When the lock is in the position shown in Figure 2 the door of the cage is locked shut. The upper central portion of each door is cut away as indicated in Figure 2 and 3 to engage and support the filling trough which will now be described.

Projecting downwardly beneath the floor of each cage except the bottom one and beneath the roof of the top cage are transverse angles $D$ $D^1$. These angles are located adjacent the outer wall of the cage near the wall of the car and the inner wall of the cage near the aisle. These two angles carry filler blocks $D^2$ $D^3$ in which are socketed the two ends of a fixed guide pipe $D^4$. The angle $D^1$ and the filler block $D^3$ are apertured so that the rod $D^5$ may pass through. The angle $D^1$ is apertured in register with the pipe $D^4$ so that the rod $D^6$ may pass through. $D^7$ is a hanger apertured to be engaged by the rods $D^5$ and $D^8$. $D^9$ is a hanger apertured and engaged by the rods $D^5$ $D^6$ and $D^8$. The arrangement of the three rods, the two hangers $D^7$ and $D^9$ and the pipe is such that the hangers may be longitudinally displaced but are held in fixed parallel relation equidistant from one another and held against angular displacement.

The hanger $D^7$ is provided with a pivot pin E which projects rearwardly from the semi-cylindrical trough $E^1$. The hanger $D^9$ is provided with a slot $E^2$ in which is supported the pivot pin $E^3$ which projects forwardly from the end of the trough $E^1$. Filler sleeves $E^4$ $E^5$ are disposed between the ends of the trough and the hangers. $E^6$ is a locking handle held rigidly on the pivot pin $E^3$ and located parallel with the plane of the top of the trough. The ends of this handle are recurved as indicated at $E^7$ in Figure 7 and intermediate their ends adjacent the recurved portions, the handles are reduced in thickness as indicated at $E^8$. These handles are of such length that as they lie in the open space intermediate the two ends of the gates as shown for instance in Figure 3, the reduced portion of the handle commences just before the gate is reached and the ends of the handles not reduced may penetrate between the two slats of the gate as indicated in Figure 4 to lock the trough in the Figure 4 position. When the trough is to be drawn out of the cage for feeding, the handle is seized, the trough is raised up, the slot $E^2$ making this possible. This disengages the end of the handle $E^6$ from behind the gate slats and the trough may be withdrawn into the aisle for cleaning and filling. When the poultry has been fed, the trough may be raised slightly at the inner end, the slot $E^2$ making this possible and may then be drawn out slightly to disengage the handle from the door. The trough may then be rotated through an angle of 180° into the upside down or dotted line position shown in Figure 6, and then the handle may be reengaged with the door to lock the trough in that position. This increases the head room in the trough at the cage so as to permit the poultry to circulate freely from one end of the cage to the other, permits drainage of the trough and keeps it clean.

The fact that the trough is intermediate the two ends of the cage gives it greater feeding capacity and the fact that no clearance is needed between cages to take care of the troughs gives greater cage volume. Moreover having the trough in the middle of the cage provides better illumination for the trough and for the cage and therefore as is well-known improves the feeding of the chickens because they will not eat in the dark.

The trough handle is located outside the cage gate or door and interferes with the door opening. The result of this is that the trough serves as a double or additional lock for the gate. The gate can only be opened by rotating the trough part way and raising it slightly so that the handles clear the gate.

Attention is called to the fact that the placing of the feed troughs actually inside the cage where the chickens are and at a point intermediate the two ends of the cage so that chickens may feed from both sides results in increased feeding capacity, results in increased cage capacity because it is not necessary to save space outside the cages for the trough and since it makes it unnecessary to have any separate partitions at the ends of the cages to protect the trough it makes it possible to have a screen partition at the ends of the cages to protect the trough, it makes it possible to have a screen partition only so that there are no opaque or closed partitions between the cages to darken them or to prevent air circulation longitudinally of the car.

I claim:

1. In combination with a poultry coop, a feed trough extending transversely thereacross adjacent the top and center thereof, means for rotating the trough about a longitudinal axis and for selectively locking it in the upright and in the reverse position.

2. In combination with a poultry coop, a feed trough extending transversely thereacross adjacent the top and center thereof, a support upon which the trough is slidably mounted for withdrawal longitudinally from the coop, the support being adapted to hold the trough in position when so withdrawn for filling.

3. In combination with a poultry coop, a feed trough extending transversely between the ends and adjacent the top thereof, means for rotating the trough about a longitudinal axis and for selectively locking it in the upright and in the reverse position, the locking means comprising a handle, a stop on the coop with which it interlocks and a trough support adapted to permit raising one end of the trough and longitudinal movement thereof to release the lock from engagement with the stop.

4. In combination with a poultry coop, a feed trough extending transversely thereacross adjacent the top and center thereof, brackets depending downwardly from the top of the coop upon which the trough is pivotally mounted.

5. In combination with a poultry coop, a feed trough extending transversely between the ends and adjacent the top thereof, brackets depending downwardly from the top of the coop upon which the trough is pivotally mounted, the brackets being movable parallel with the trough to permit longitudinal displacement for filling and cleaning.

6. In combination with a poultry coop, a feed trough extending transversely between the ends and adjacent the top thereof, brackets depending downwardly from the top of the coop upon which the trough is pivotally mounted, a support by which the brackets are held against angular displacement.

7. In combination with a poultry coop, a feed trough extending transversely between the ends and adjacent the top thereof, brackets depending downwardly from the top of the coop upon which the trough is pivotally mounted, the brackets being movable parallel with the trough to permit longitudinal displacement for filling and cleaning, the brackets being held against angular displacement.

8. In combination with a poultry coop, a feed trough extending transversely between the ends and adjacent the top thereof, means for rotating the trough about a longitudinal axis and for selectively locking it in the upright and in the reverse position, a door forming one side of the coop perpendicular to the trough, means for locking the door in position, the trough locking means interlocking with the door to provide auxiliary door locking means.

9. A poultry car comprising a car body, a plurality of poultry coops contained within the body and arranged longitudinally therealong to form an aisle longitudinal of the car between the coops, the coops being provided with roof and floor, the roof of one coop furnishing the floor of the coop above, partitions transverse of the car dividing separate coops one from the other, the side of the coop on the aisle being pivoted to form a removable door extending the entire area of the coop, the doors being pivoted at their bottoms and latches at the top to hold the doors in position.

10. A poultry car comprising a car body, a plurality of poultry coops contained within the body and arranged longitudinally therealong to form an aisle longitudinal of the car between the coops, the coops being provided with roof and floor, the roof of one coop furnishing the floor of the coop above, partitions transverse of the car dividing separate coops one from the other, the side of the coop on the isle being pivoted to form a removable door extending the entire area of the coop, the doors being pivoted at their bottoms and latches at the top to hold the doors in position, a trough for each coop perpendicular to the door located intermediate the ends of the coop and adjacent the top thereof.

11. A poultry car comprising a car body, a plurality of poultry coops contained within the body and arranged longitudinally therealong to form an aisle longitudinal of the car between the coops, the coops being provided with roof and floor, the roof of one coop furnishing the floor of the coop above, partitions transverse of the car dividing separate coops one from the other, the side of the coop on the aisle being pivoted to form a removable door extending the entire area of the coop, the doors being pivoted at their bottoms and latches at the top to hold the doors in position, a trough for each coop perpendicular to the door located intermediate the ends of the coop and adjacent the top thereof, the door being apertured to permit longitudinal withdrawal of the trough across the aisle for filling and cleaning.

12. A poultry car comprising a car body, a plurality of poultry coops contained within the body and arranged longitudinally therealong to form an aisle longitudinal of the car between the coops, the coops being provided with roof and floor, the roof of one coop furnishing the floor of the coop above, partitions transverse of the car dividing separate coops one from the other, the side of the coop on the aisle being pivoted to form a removable door extending the entire area of the coop, the doors being pivoted at their bottoms and latches at the top to hold the doors in position, a trough for each coop perpendicular to the door located intermediate the ends of the coop and adjacent the top thereof, the door being apertured to permit longitudinal withdrawal of the trough across the aisle for filling and cleaning, the troughs being pivoted and means for locking them selectively in the upright and in the reverse position, the pivot point of the trough being adjacent the top thereof.

Signed at Chicago, county of Cook and State of Illinois, this 27th day of October, 1930.

PATRICK J. DUIGNAN.